(12) United States Patent
Muegge

(10) Patent No.: US 11,014,489 B2
(45) Date of Patent: May 25, 2021

(54) LIGHTING DEVICE FOR VEHICLES

(71) Applicant: HELLA GmbH & CO. KGAA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/780,461

(22) Filed: Feb. 3, 2020

(65) Prior Publication Data
US 2020/0172001 A1 Jun. 4, 2020

Related U.S. Application Data

(63) Continuation of application No. PCT/EP2018/070645, filed on Jul. 31, 2018.

(30) Foreign Application Priority Data

Aug. 1, 2017 (DE) .......................... 102017117392.7

(51) Int. Cl.
*B60Q 1/26* (2006.01)
*F21S 43/19* (2018.01)
(Continued)

(52) U.S. Cl.
CPC ............ *B60Q 1/2607* (2013.01); *F21S 43/19* (2018.01); *F21S 43/26* (2018.01); *F21S 43/31* (2018.01);
(Continued)

(58) Field of Classification Search
CPC .............. B60Q 1/2607; B60Q 2400/50; B60Q 1/0041; B60Q 1/0058; F21S 43/19;
(Continued)

(56) References Cited

U.S. PATENT DOCUMENTS 6,505,962 B2   1/2003   Gotou
7,077,552 B2   7/2006   Ishida
(Continued)

FOREIGN PATENT DOCUMENTS

DE   10 2004 019 857 A1   12/2004
DE       102005002535 B3 *   3/2006   .............. F21V 11/08
(Continued)

OTHER PUBLICATIONS

Jacquot RENAUD, "Optical Block with Coupled Illumination Functions", Aug. 24, 2007, Patent Translate Powered by EPO, Description FR2897672A1, pp. 1-4.*
(Continued)

*Primary Examiner* — Alan B Cariaso
(74) *Attorney, Agent, or Firm* — Muncy, Geissler, Olds & Lowe, P.C.

(57) ABSTRACT

A lighting device for vehicles with a light source unit, having a plurality of first light sources and second light sources, an optical unit for generating at least two different light distributions containing a light panel and a diffusing structure. The first light source and the second light source are arranged at a distance from the light panel and/or the diffusing structure. The light panel and/or the diffusing structure are provided a diaphragm with apertures for the passage of light emitted by the first light source and/or the second light source, wherein a contour of the openings predefines a light signature for the light distributions. The second light source is designed as an additional light source, which is associated with an additional optical system for focusing the light emitted by the additional light source in the direction of a delimited region of the diaphragm.

11 Claims, 3 Drawing Sheets

(51) Int. Cl.
  *F21S 43/31* (2018.01)
  *F21S 43/20* (2018.01)
  *F21V 11/08* (2006.01)
  *F21S 43/40* (2018.01)
  *F21S 43/50* (2018.01)
  *B60Q 1/00* (2006.01)

(52) U.S. Cl.
  CPC .............. *F21S 43/40* (2018.01); *F21S 43/50* (2018.01); *F21V 11/08* (2013.01); *B60Q 1/0041* (2013.01); *B60Q 2400/50* (2013.01)

(58) Field of Classification Search
  CPC .. F21S 43/26; F21S 43/31; F21S 43/14; F21S 43/40; F21S 43/50; F21S 41/43; F21S 41/435; F21V 11/08; F21V 11/12; F21V 11/14
  See application file for complete search history.

(56) References Cited

U.S. PATENT DOCUMENTS

| | | |
|---|---|---|
| 9,664,354 B1 | 5/2017 | Dellock et al. |
| 9,688,034 B2 | 6/2017 | Ovenshire et al. |
| 10,458,619 B2 | 10/2019 | Huebner et al. |
| 2016/0010811 A1* | 1/2016 | Benitez ................. F21S 41/153 362/509 |
| 2019/0078751 A1* | 3/2019 | Colombel ............... F21S 43/14 |

FOREIGN PATENT DOCUMENTS

| | | |
|---|---|---|
| DE | 10 2007 038 470 A1 | 2/2009 |
| DE | 10 2013 107 355 A1 | 1/2015 |
| DE | 10 2015 115 051 A1 | 4/2016 |
| DE | 10 2010 013 821 B4 | 9/2016 |
| DE | 20 2017 100 541 U1 | 6/2017 |
| DE | 10 2016 205 644 A1 | 10/2017 |
| EP | 2 390 137 A1 | 11/2011 |
| FR | 2 897 672 A1 | 8/2007 |
| JP | 2015-069862 A | 4/2015 |
| WO | WO 2007/096559 A1 | 8/2007 |

OTHER PUBLICATIONS

Jacquot RENAUD, "Optical Block with Coupled Illumination Functions", Aug. 24, 2007, Patent Translate Powered by EPO, Claims FR2897672A1, pp. 1-3.*

* cited by examiner

LIGHTING DEVICE FOR VEHICLES

This nonprovisional application is a continuation of International Application No. PCT/EP2018/070645, which was filed on Jul. 31, 2018, and which claims priority to German Patent Application No. 10 2017 117 392.7, which was filed in Germany on Aug. 1, 2017, and which are both herein incorporated by reference.

BACKGROUND OF THE INVENTION

Field of the Invention

The present invention relates to a lighting device for vehicles having a light source unit containing a plurality of first light sources and second light sources, with an optical unit for generating at least two different light distributions containing a light panel and a diffusing structure, that the first light source and the second light source are arranged at a distance to the light panel and/or the diffusing structure.

Description of the Background Art

DE 10 2013 107 355 A1 discloses a lighting device for vehicles which is used to generate at least two different light functions or light distributions. The lighting device comprises a light source unit having first light sources and second light sources and an optical unit for generating the two different light distributions. The optical unit comprises a light panel element which is provided with a diffusing structure on a front side, when seen in the main emission direction, so that homogeneous illumination of a light panel arranged on the front side, when seen in the main emission direction, is ensured. A disadvantage of the known lighting device is that the outlay required to provide the light sources is relatively great. Because each light panel element is associated with several light sources. Since the light sources are essentially arranged in the focal point of the respective light panel elements, each light panel element is used exclusively for guiding the light emitted by the respective directly associated light sources.

SUMMARY OF THE INVENTION

It is therefore an object of the present invention to provide a lighting device for vehicles in such a way that in simple manner, homogeneous radiation by at least two different lighting functions is provided.

To achieve this object, the light panel and/or the diffusing structure can be provided with a diaphragm with apertures for the passage of light emitted by the first light source and/or the second light source, wherein a contour of the apertures provides a light signature of the light distributions, that the second light source is designed as an additional light source, which is associated with an additional optical system for focusing the light emitted by the additional light source onto an area of the diaphragm that is smaller than an area that is illuminated by one of the first light sources, for generating a second light distribution different from the first light distribution with variable light intensity, in particular a higher light intensity than that of the first light source.

An advantage of the invention is that homogeneous illumination of different light functions can be emitted according to a specified light signature in a simple manner. According to the invention, a diaphragm is associated with a light panel and/or a diffusing structure, wherein the apertures of the diaphragm define a contour of the light signature. Since the diaphragm, together with the light panel and/or the diffusing structure, are arranged at a distance from a first light source and a second light source, the first light source can work to generate both a first light distribution and a second light distribution. Thus, homogeneous illumination of all apertures is easy to implement. By superimposing the first and second light sources, there is a basic brightness in the apertures serving as light outlets which can be used to generate a taillight function, for example.

To generate a more powerful second light function, a second light source (additional light source) is switched on, to which an additional optical system is assigned, so that the light emitted by the second light source is focused to a smaller area associated with it. For example, the area that is illuminated by the second light source can be several, e.g., two closely arranged, apertures. However, the light from the second light source is preferably focused by the additional optical system in such a way that essentially exactly one of the apertures is illuminated. This/these aperture (s) thus have a multiple function. In a first state of the lighting device, in which only the first light sources are switched on, light of a first light intensity and possibly additional light from the dimmed second light source is emitted through this/these aperture (s) to produce the first light distribution. In a second state of the lighting device, in which the first light source and the second light source are switched on, or only the second light source is switched on, light of higher luminous intensity is emitted through the same aperture (s) to generate the second light distribution. The basic idea of the invention is to provide an additional light source and an additional optical system which, to generate an additional light function, use the same light outlet opening (s) as the first light sources which serve to generate the first light function. The contour of the apertures provides a desired light signature, which can be designed, for example, in the form of lines, i.e., straight-lined or arcuate or circular or with any desired contour. The additional light source utilizes an additional optical system, which differs from the first light sources and which is preferably arranged such that the light beam emitted by the first light sources is not obstructed or cut in the direction of the apertures.

The additional optical system can be designed in such a way that the focusing is greater than the focusing of a base optical system that is associated with the first light sources. Due to the stronger focusing, light with a greater luminous intensity and/or brightness can be emitted from the area associated with the additional optical system, so that for example a brake light function is generated, whereas, for example, a taillight function is generated by the first light sources in conjunction with the base optical system.

An optical axis of the additional optical system and the additional light source can run through the aperture associated with them. A standard of the aperture coincides with the optical axis, so that the additional light source, the additional optical system and the aperture associated with them are arranged at the same height. This advantageously allows for the light emitted by the additional light source to be optimally focused.

The base optical system can be designed in such a way that light emitted by the first light sources is deflected for the illumination of multiple apertures. In this way, a homogeneous radiation of the first light function can advantageously take place over several apertures.

The base optical system and/or the additional optical system can be designed as a light panel or as a reflector. The desired light function can thus be provided with a conventional light guide.

An optical axis of the first light source can be arranged perpendicular to a main emission direction of the lighting device. The light emitted by the first light source is directed onto an arc-shaped reflector which, in projection onto the diaphragm, covers the same with the exception of the aperture associated with the additional light source. The reflector has a recess which is aligned with the aperture associated with the additional light source. In this embodiment, the first light sources can be arranged in a horizontal plane so as not to be visible to an observer from the outside. If the additional light source is also to be arranged laterally on the edge, not visible to an outside observer, a light guide could be arranged between the recess of the reflector and the additional light source. Then, if necessary, the additional light source could be arranged on the same circuit board as the first light sources.

The reflector can have an additional section in the area of the recess, which protrudes from an extension direction of a main section of the reflector. Advantageously, the additional optical system for the additional light source can be formed in this way. Alternatively, the additional optical system can be formed by a light panel element, which allows for stronger focusing but requires an additional component.

The diffusing structure can be applied on the light panel so that the component cost is reduced.

The diaphragm can be firmly connected to the light panel, so that the component cost is further reduced.

A cover plate can be arranged in front of the light panel, when seen in the main radiation direction, closing off a housing which accommodates the light source unit and the optical unit. The light panel is thus part of the optical unit and enables homogenous light radiation.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A lighting device according to the invention serves to generate signal functions, such as, for example, a combined taillight and brake light function or a combined taillight and turn signal function. It can thus be arranged in the rear of the motor vehicle. Alternatively, the lighting device can also be used in the front or as another type if light.

Figure 1:
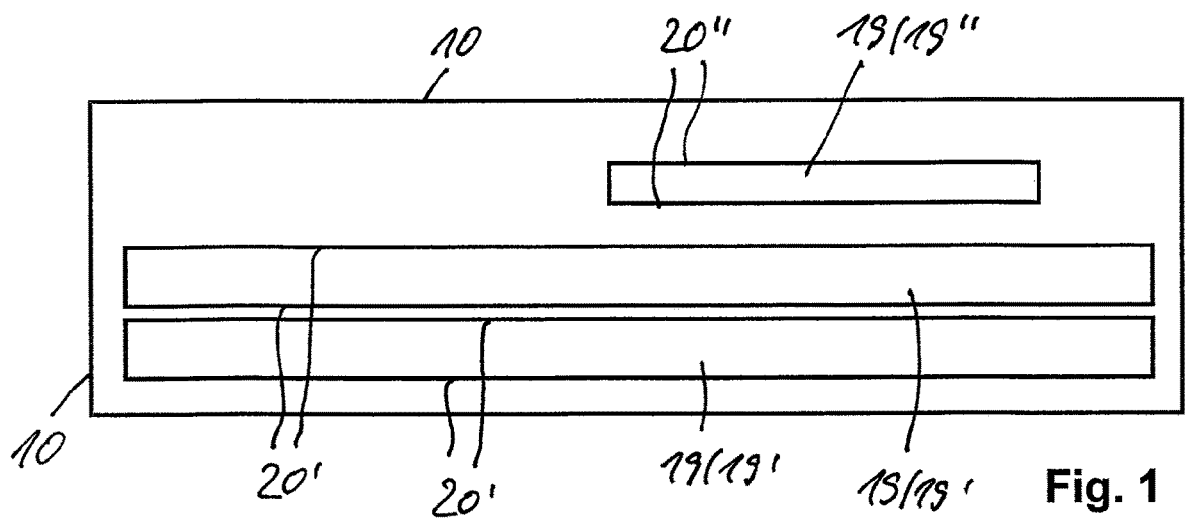
FIG. 1 is a schematic front view of a lighting device with elongated and straight-lined light signatures.
Figure 2:
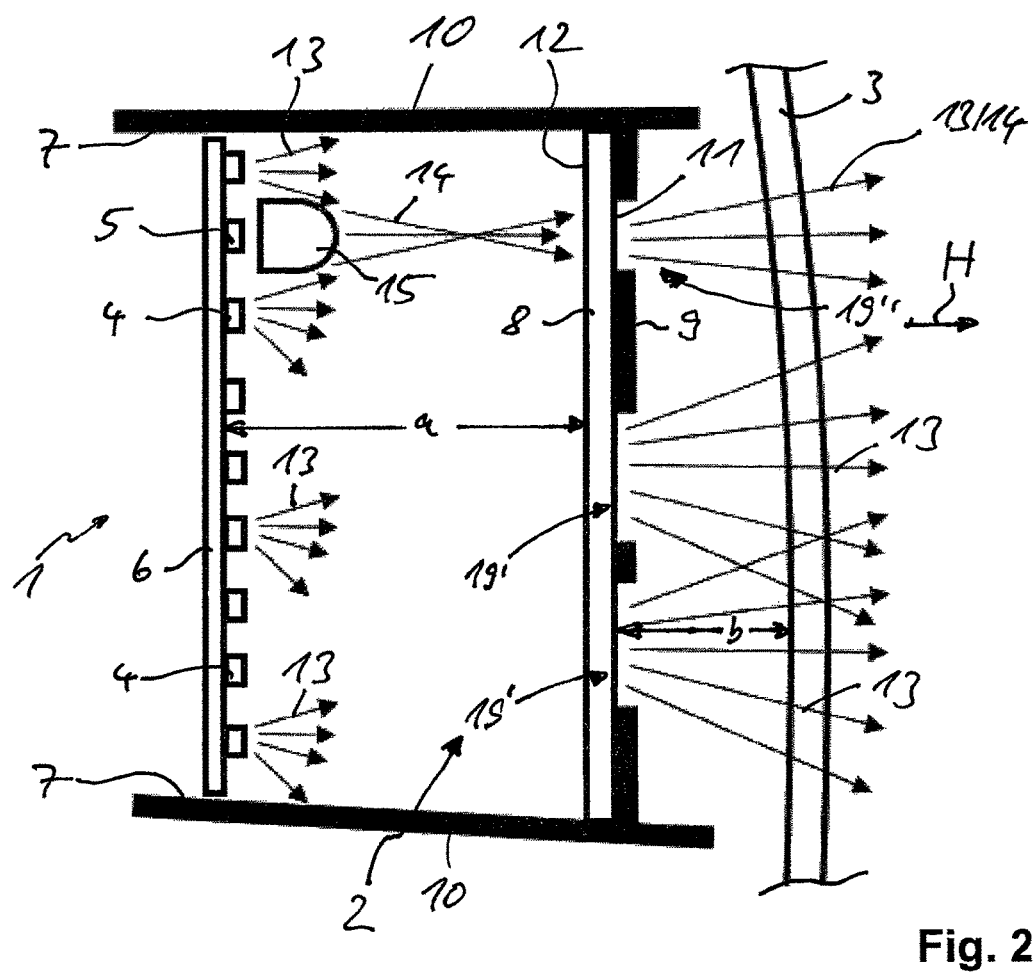
FIG. 2 is a schematic vertical section through the lighting device according to an exemplary embodiment.

According to an exemplary embodiment of the invention according to FIGS. 1 and 2, a light source unit 1 and an optical unit 2 are provided, which are arranged in the main emission direction H in front of the light source unit 1 for generating two different light distributions. The light source unit 1 and the optical unit 2 are arranged within a housing 10, the opening of which is closed by a translucent cover plate 3.

The light source unit 1 is formed by a plurality of first light sources 4 and additional light sources 5 (second light sources) which are arranged on a common support plate 6. The support plate 6 extends perpendicular to the main emission direction H. The support plate 6 is flat. On the support plate 6, the light sources 4, 5 are evenly distributed and preferably arranged in a matrix. In the present exemplary embodiment, the support plate 6 is arranged as a rectangle, wherein an edge of the support plate 6 substantially corresponds to an edge contour 7 of the housing 10.

The optical unit 2 is formed by a light panel 8 and a diaphragm 9, which are arranged at a distance a in front of the support plate 6. The light panel 8 is transparent and has a diffusing structure, on a front side 11 and/or a rear side 12. The diffusing structure is designed as a surface structure, for example, in the form of an EDM or etched or laser structure. Alternatively, the diffusing structure can also be formed by diffusion particles integrated in the light panel 8. The diffusing structure causes light 13 striking it from the first light sources 4 and light 14 striking it from the additional light source 5 to be scattered laterally to the optical axis, so that a relatively broad light distribution can be generated. Alternatively, the diffusing structure can also be designed as calculated diffractive diffuser optics or by means of a diffractive structure in the form of a holographic diffuser or a diffractive optical element (DOE).

The aperture 9 is preferably applied to the front side 11 of the light panel 8, for example by printing, spraying, coating. The diaphragm 9 has a plurality of apertures 19 through which the light 13, 14 can pass to the outside into the environment. As can be seen in particular from FIG. 1, two long apertures 19' and a short aperture 19" are provided, which are arranged one above the other in the vertical direction. The apertures 19', 19" are elongated and straight-lined, in particular bar-shaped. A contour 20', 20" of the apertures 19, 19', 19" predefines the light signature of the light distributions.

In a first state of the lighting device, in which only the first light sources 4 are switched on, the light 13 passes through the apertures 19', 19" to generate the first light function, preferably the taillight function. For this purpose, the first light sources 4 are designed in such a way that they emit the light 13 of a red light color. The apertures 19', 19" are illuminated with the same brightness (same light intensity).

In a second state of the lighting device, not only the first light sources 4, but also the additional light sources 5 are switched on. The additional light source 5 is associated with an additional optical system 15, by means of which the light 14 emitted by the additional light source 5 is focused in the direction of the upper aperture 19". Thus, a superimposition of the emitted light 13 of the first light sources 4 and light 14 of the additional light sources 5 occurs at the upper aperture 19". It is thus possible to emit light of higher intensity or brightness at the aperture 19" in order to generate the brake light function. In this case, the additional light source 5 is designed such that it emits the light 14 of the red light color. For example, the additional light source 5 can be designed to be the same as the first light source 4. Alternatively, the additional light source 5 can also be designed to be more powerful than the first light source 4.

According to an alternative embodiment of the invention, the additional light source 5 can also be designed such that it emits light of a yellow light color, so that the second light distribution or additional light distribution serves as a turn signal light function.

Further, as an alternative to the variant illustrated in FIG. 1, in which the light 14 emitted by the additional light source 5 is focused only in the direction of the one aperture 19", the additional optical system 15 can be designed according to a not-shown embodiment in such a way that it illuminates an area which comprises more than one aperture, but which is smaller than the area which is illuminated by the light emitted by one of the first light sources 4.

As can be seen from FIG. 2, the additional optical system 15 is designed as a light panel. If necessary, the additional optical system 15 can also be designed as a Fresnel lens, an aspheric lens or a free-form lens. A plurality of light panels can be provided as an additional optical system 15, wherein each light panel is associated with an additional light source 5. Alternatively, the additional optical system 15 can also be designed to be linear, as a line lens, the line lens running parallel to the aperture 19". On a side facing the light panel 8, the additional optical system 15 is contoured as a curve in a cross section to the aperture 19" and contoured as a straight line in a longitudinal section to the aperture 19".

According to an embodiment in a second state of the lighting device, it is possible for only the additional light sources 5 to be switched on, whereas the first light sources 4 are switched off. In this case, the difference in brightness between the first state and the second state of the lighting device is smaller. This embodiment is an option if the additional light source 5 is particularly bright.

Figure 3:
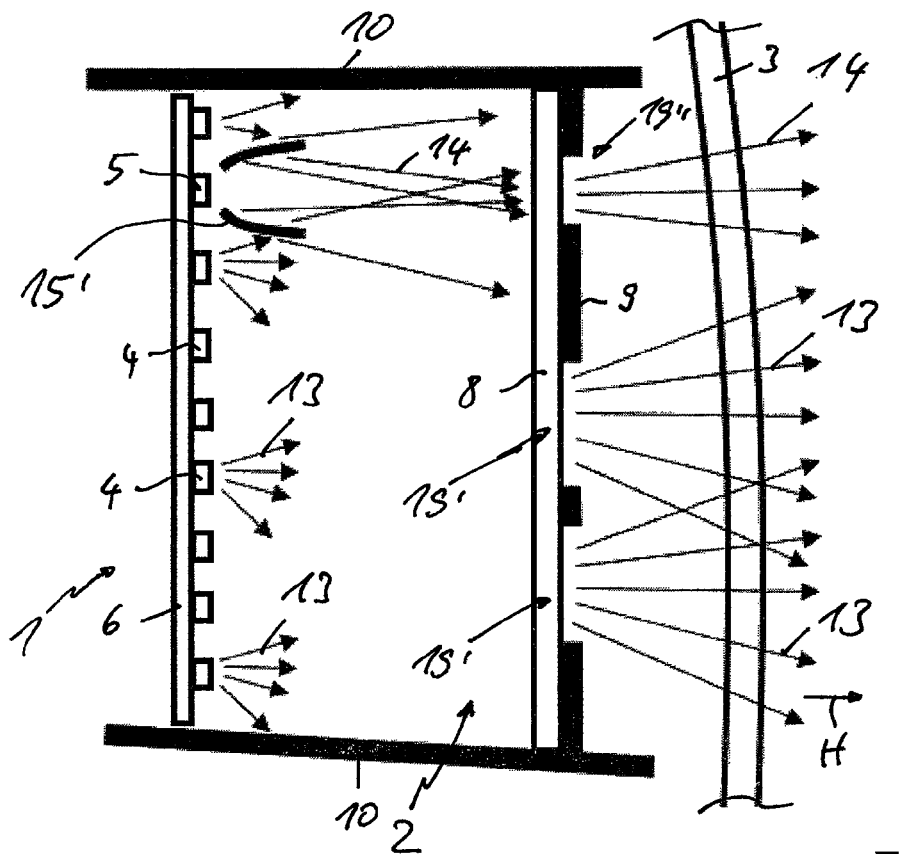
FIG. 3 is a schematic vertical section through the lighting device according to an exemplary embodiment.

According to an embodiment of the invention according to FIG. 3, the additional optical system can also be formed by a reflector 15' instead of a light panel. This is preferably formed trough-shaped in one piece.

Figure 4:
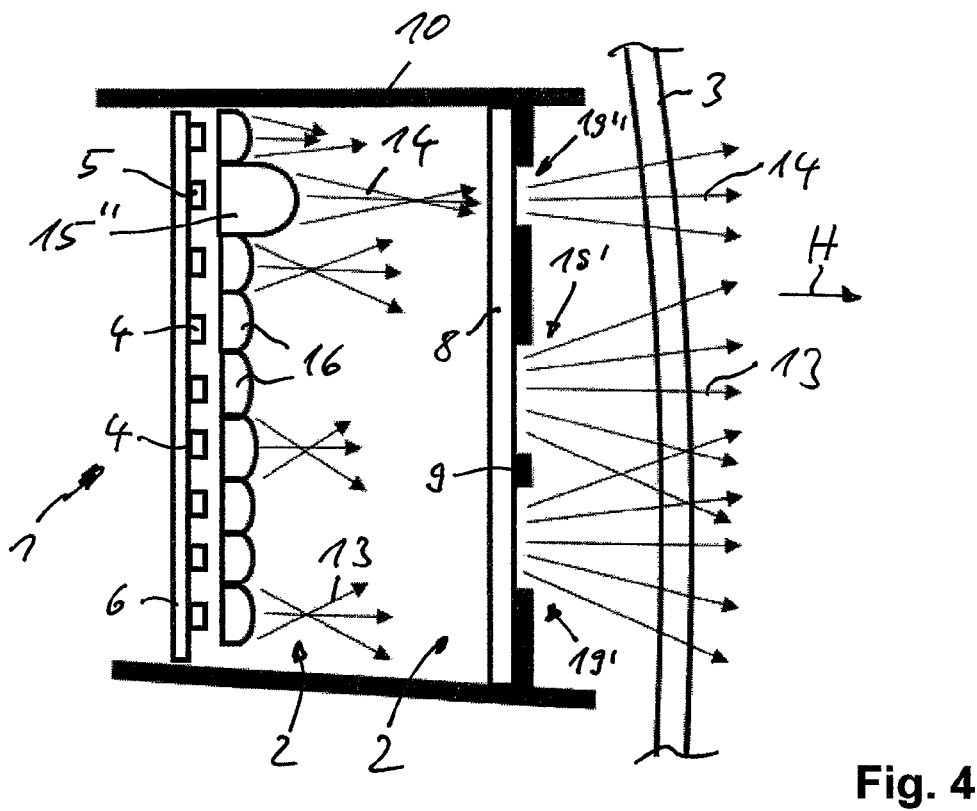
FIG. 4 is a schematic vertical section through the lighting device according to an exemplary embodiment.

According to a further embodiment of the invention according to FIG. 4, the first light sources 4 are associated with a base optical system 16, which is formed of a plurality of light panels each associated with first light sources 4 or of a horizontal row of an elongated light panel 16 associated with first light sources 4. The base optical system 16 is designed in such a way that the light emitted by the first light sources 4 is concentrated less in comparison to an additional optical system 15" associated with the additional light source 5. The light panel of the additional optical system 15" is shaped such that the light 14 emitted by the additional light source 5 essentially strikes the aperture 19". The light panel elements of the base optical system 16 are designed in such a way that the light 13 emitted by the first light sources 4 is concentrated less, namely in the range of the height of at least two apertures 19', 19".

The intensity of the light 14 focused by the additional optical system 15 is greater than the intensity of the base optical system 16 through which the light 13 of the first light sources 4 passes.

Alternatively, the intensity of the light 14 focused by the additional optical system 15 may be greater than the intensity of the light 13, which is directly emitted by the first light source 4 to the light panel 8 without the provision of an optical system.

Figure 5:
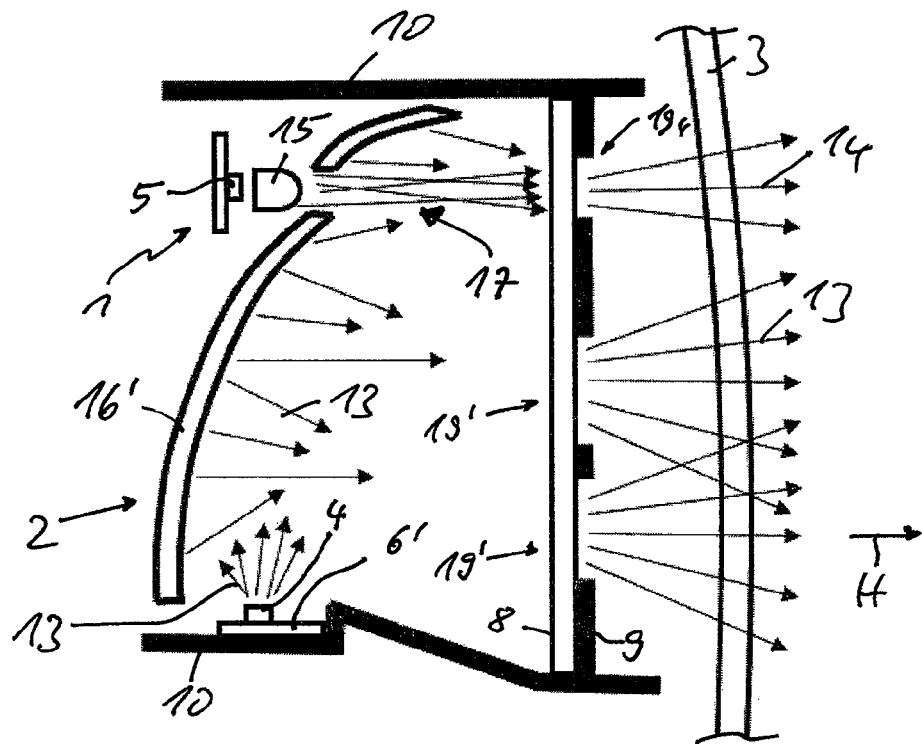
FIG. 5 is a schematic vertical section through the lighting device according to an exemplary embodiment.

According to a further embodiment of the invention according to FIG. 5, the first light sources 4 are arranged on a narrow support plate 6' which extends in a horizontal direction in a lower region of the housing 10. A reflector 16' of the base optical system 16 extends above the first light sources 4. The reflector 16' basically extends from the underside of the housing 10 to the top of the housing 10. In projection onto the light panel 8 or the diaphragm 9, the reflector 16' covers the entire light panel 8 or the entire diaphragm 9 with the exception of the upper aperture 19", which serves to emit the additional light function. For this purpose, the reflector 16' has a recess 17 at the height of the aperture 19" through which the light 14 emitted by the additional light source 5 can pass through. The additional light source 5 is arranged together with the additional optical system 15 at the height of the aperture 19". An optical axis of the additional optical system 15 and the additional light source 5 extends through the aperture 19". The reflector 16' forms an indirect reflector assembly that deflects the light 13 emitted by the first light sources 4 by substantially 90°.

Advantageously, the first light sources 4 can be arranged so that they are shielded and invisible to an observer from the outside. In addition, the number of the first light sources 4 can also be reduced, since they are only arranged on the support plate 6 in a line and not in the form of a matrix as in the previous exemplary embodiments.

Figure 6:
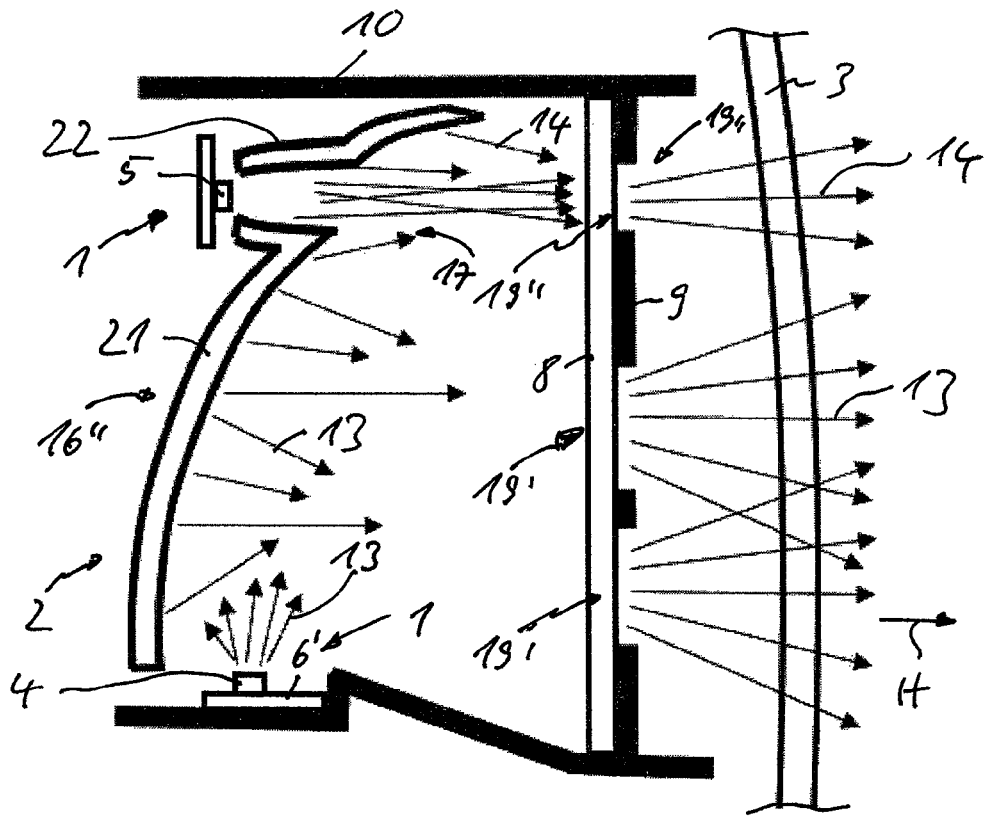
FIG. 6 is a schematic vertical section through the lighting device according to an exemplary embodiment.

According to a further embodiment of the invention according to FIG. 6, in comparison to the preceding exemplary embodiment, a reflector 16" is provided, which—as in the embodiment according to FIG. 5—has a main section 21 for the reflection of the light 13 emitted by the first light sources 4. In addition, the reflector 16" has an additional section 22 which is located at the height of the aperture 19" and the additional light source 5. The additional section 22 of the reflector 16" is associated with the additional light source 5 and is formed such that the light 14 emitted by the additional light source 5 is concentrated exclusively onto the aperture 19". The additional section 22 of the reflector 16" thus forms an additional reflector which is molded on the main section 21 of the reflector 16".

Optionally, the reflectors 16', 16" can have light-scattering optical elements on the surface, for example cushion, strip or prism optical elements. The surfaces of the reflectors 16', 16" are designed as parabolic surfaces or free-form surfaces.

According to an alternative embodiment, the diaphragm 9 can also be designed as a separate part which is supported on the front side of the light panel 8. Thus, the diaphragm 9 does not have to be firmly connected to the light panel 8.

The distance a between the light sources 4, 5 and the light panel 8 is greater than a distance b between the light panel 8 and the cover plate 3.

The distance a is chosen to be great enough that the light 13 emitted by the first light source 4 reaches all apertures 19, 19" or illuminates them in a planar manner.

The first light source 4 and the second light source 5 can be operated independent of each other and with different intensity in order to enable a fully homogeneous illumination of all apertures 19, 19', 19" or an illumination of greater intensity of the aperture 19" corresponding to the second light source 5. Alternatively, only the second light source 5 can be switched on for the sole or partial illumination of the aperture 19' associated with the second light source 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for vehicles, the lighting device comprising:
 a light source unit comprising a first light source and second light source;
 an optical unit for generating at least two different light distributions containing a light panel having a diffusing structure;
 wherein the first light source and the second light source are arranged at a distance to the light panel,
 wherein the light panel is provided with a diaphragm having apertures for the passage of light emitted by the first light source and/or the second light source,
 wherein a contour of the apertures predefines a light signature of the light distributions,
 wherein the second light source is designed as an additional light source, which is associated with an additional optical system for focusing the light emitted by the additional light source in a direction of a delimited region of the diaphragm, the delimited region of the diaphragm being smaller than an area that is illuminated by the first light source so that a second light distribution is generated which differs from a first light distribution by having a higher intensity than an intensity provided by the first light distribution, and
 wherein the light panel is positioned between the light source unit and the diaphragm.

2. The lighting device according to claim 1, wherein the additional optical system is formed such that the intensity of the light focused by the additional optical system is greater than the intensity of the light focused by a base optical system, which is associated with the first light source, or the intensity of the light focused by the additional optical system is greater than the intensity of the light which is emitted by the first light source directly to the light panel without the provision of the base optical system.

3. The lighting device according to claim 1, wherein an optical axis of the additional optical system and of the additional light source extends through the aperture associated with the additional light source.

4. The lighting device according to claim 2, wherein the base optical system is formed such that light emitted by the first light source is deflected for the homogeneous illumination of several apertures.

5. The lighting device according to claim 2, wherein the base optical system and/or the additional optical system are designed as a light panel or as a reflector.

6. The lighting device according to claim 1, wherein the first light source is disposed oriented perpendicular to the main emission direction and a reflector associated with the first light source extends in an arcuate shape, wherein the reflector, in projection onto the diaphragm, covers all apertures with the exception of the aperture associated with the additional light source and wherein the reflector has a recess which, in projection onto the diaphragm, covers the aperture associated with the additional light source.

7. The lighting device according to claim 6, wherein the reflector has a main section for deflecting the light emitted by the first light source and an additional section for deflecting the light emitted by the additional light source or that the additional optical system is arranged offset to the recess or in the recess in the main emission direction.

8. The lighting device according to claim 1, wherein the diffusing structure is applied on the light panel and is formed as an EDM, etched or laser structure or as a calculated diffractive diffuser optics.

9. The lighting device according to claim 1, wherein the diaphragm is fixedly connected to the light panel and a cover plate is arranged in the main emission direction in front of the light panel, which closes off a housing that accommodates the light source unit and the optical unit.

10. The lighting device according to claim 1, wherein the first light source and the second light source are operated independent of one another and with a different intensity in order to enable a completely homogeneous illumination of all apertures or a higher intensity illumination of the delimited region associated with the second light source or wherein only the second light source is operable for the partial illumination of the delimited region associated with the second light source.

11. The lighting device according to claim 1, wherein the first light source and the second light source are both disposed on a same flat support plate.

* * * * *